US012168410B2

United States Patent
Fish, Jr. et al.

(10) Patent No.: US 12,168,410 B2
(45) Date of Patent: Dec. 17, 2024

(54) IMAGING SYSTEM FOR A VEHICLE

(71) Applicant: Gentex Corporation, Zeeland, MI (US)

(72) Inventors: Richard T. Fish, Jr., Hudsonville, MI (US); Joshua D. Lintz, Allendale, MI (US); Eric S. Sloterbeek, Hudsonville, MI (US); Derek S. Blaskowski, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 51 days.

(21) Appl. No.: 18/109,395

(22) Filed: Feb. 14, 2023

(65) Prior Publication Data
US 2023/0256908 A1  Aug. 17, 2023

Related U.S. Application Data

(60) Provisional application No. 63/309,815, filed on Feb. 14, 2022, provisional application No. 63/359,957, filed on Jul. 11, 2022.

(51) Int. Cl.
*B60R 1/12* (2006.01)
*B60R 1/02* (2006.01)
(Continued)

(52) U.S. Cl.
CPC ............ *B60R 1/12* (2013.01); *B60R 1/02* (2013.01); *B60W 40/08* (2013.01); *G06V 40/18* (2022.01); *B60R 1/1207* (2013.01); *B60R 2001/1253* (2013.01); *B60W 2540/225* (2020.02); *B60W 2540/229* (2020.02)

(58) Field of Classification Search
CPC .......... B60R 1/12; B60R 1/02; B60R 1/1207; B60R 2001/1253; B60W 40/08; B60W 2540/225; B60W 2540/229; G06V 40/18; G06V 10/141; G06V 10/143; G06V 20/59; G06V 20/597; G06V 40/19; G06V 40/197
See application file for complete search history.

(56) References Cited

U.S. PATENT DOCUMENTS 6,572,233 B1   6/2003   Northman et al.
8,237,909 B2   8/2012   Ostreko et al.
(Continued)

FOREIGN PATENT DOCUMENTS

EP   3562708 B1   2/2021
WO   2019064233 A1   4/2019

*Primary Examiner* — Fernando Alcon
(74) *Attorney, Agent, or Firm* — Price Heneveld LLP; Brian James Brewer

(57) ABSTRACT

An imaging system includes a mirror assembly. An imager is centrally disposed on the mirror assembly and configured to acquire an image of a biometric feature of a vehicle occupant within a field of view of the imager. A first light source is disposed within the mirror assembly and configured to project a ray of light onto a target surface corresponding to an eye of the vehicle occupant. The first light source is spaced from the target surface by a first distance. The first light source is spaced from the imager by a second distance. The ray of light forms an angle of incidence having legs extending from the target surface to the first light source and to the imager, and wherein the first distance and the second distance are operable to define the angle of incidence in the range of 5° to 15°.

20 Claims, 9 Drawing Sheets

(51) Int. Cl.
  *B60W 40/08* (2012.01)
  *G06V 40/18* (2022.01)

(56) References Cited

U.S. PATENT DOCUMENTS

| | | | |
|---|---|---|---|
| 8,339,526 | B2 | 12/2012 | Minikey, Jr. et al. |
| 8,411,245 | B2 | 4/2013 | Lee et al. |
| 11,370,449 | B2* | 6/2022 | Collins, II ............. G06V 20/59 |
| 11,639,134 | B1* | 5/2023 | Huizen .................... B60R 1/04 |
| | | | 348/77 |
| 2008/0036580 | A1* | 2/2008 | Breed ...................... B60N 2/66 |
| | | | 340/438 |
| 2009/0237208 | A1* | 9/2009 | Tsukahara .............. A61B 5/117 |
| | | | 340/5.82 |
| 2017/0177935 | A1* | 6/2017 | Weller ................... H04N 23/21 |
| 2018/0020139 | A1 | 1/2018 | Tang |
| 2018/0043829 | A1 | 2/2018 | Cordell et al. |
| 2018/0178729 | A1* | 6/2018 | Festerling, Jr. ........ G06V 20/59 |
| 2018/0260640 | A1* | 9/2018 | Lintz ................... G06V 10/143 |
| 2019/0279009 | A1* | 9/2019 | Srirangam Narashiman ............... G06T 7/248 |
| 2019/0381938 | A1* | 12/2019 | Hopkins ................ G06F 3/013 |
| 2019/0389485 | A1* | 12/2019 | Collins, II ............ B60W 40/08 |
| 2020/0207358 | A1* | 7/2020 | Katz .................. G02B 27/0093 |
| 2021/0197724 | A1 | 7/2021 | Gu et al. |
| 2021/0291737 | A1* | 9/2021 | Niu .......................... B60R 1/04 |

\* cited by examiner

IMAGING SYSTEM FOR A VEHICLE

CROSS-REFERENCE TO RELATED APPLICATIONS

This application claims priority under 35 U.S.C. § 119(e) and the benefit of U.S. Provisional Application Nos. 63/309,815 entitled IMAGING SYSTEM FOR A VEHICLE, filed on Feb. 14, 2022, and 63/359,957 entitled IMAGING SYSTEM FOR A VEHICLE, filed on Jul. 11, 2022, both by Richard T. Fish, Jr. et al., the entire disclosures of which are incorporated herein by reference.

TECHNOLOGICAL FIELD

The present invention concerns imaging systems for vehicles and, more particularly, relates to an imaging system for an interior rearview mirror assembly.

SUMMARY OF THE INVENTION

It is one aspect of the present disclosure to provide an imaging system. The imaging system includes a mirror assembly. An imager is centrally disposed on the mirror assembly and configured to acquire an image of a biometric feature of a vehicle occupant within a field of view of the imager. A first light source is disposed within the mirror assembly and configured to project a ray of light onto a target surface corresponding to an eye of the vehicle occupant. The first light source is spaced from the target surface by a first distance. The first light source is spaced from the imager by a second distance. The ray of light forms an angle of incidence having legs extending from the target surface to the first light source and the imager. The first distance and the second distance are operable to define the angle of incidence in the range of 5° to 15°.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

The components in the figures are not necessarily to scale, emphasis instead being placed upon illustrating the principles described herein.

DETAILED DESCRIPTION OF EMBODIMENTS

Figure 1:
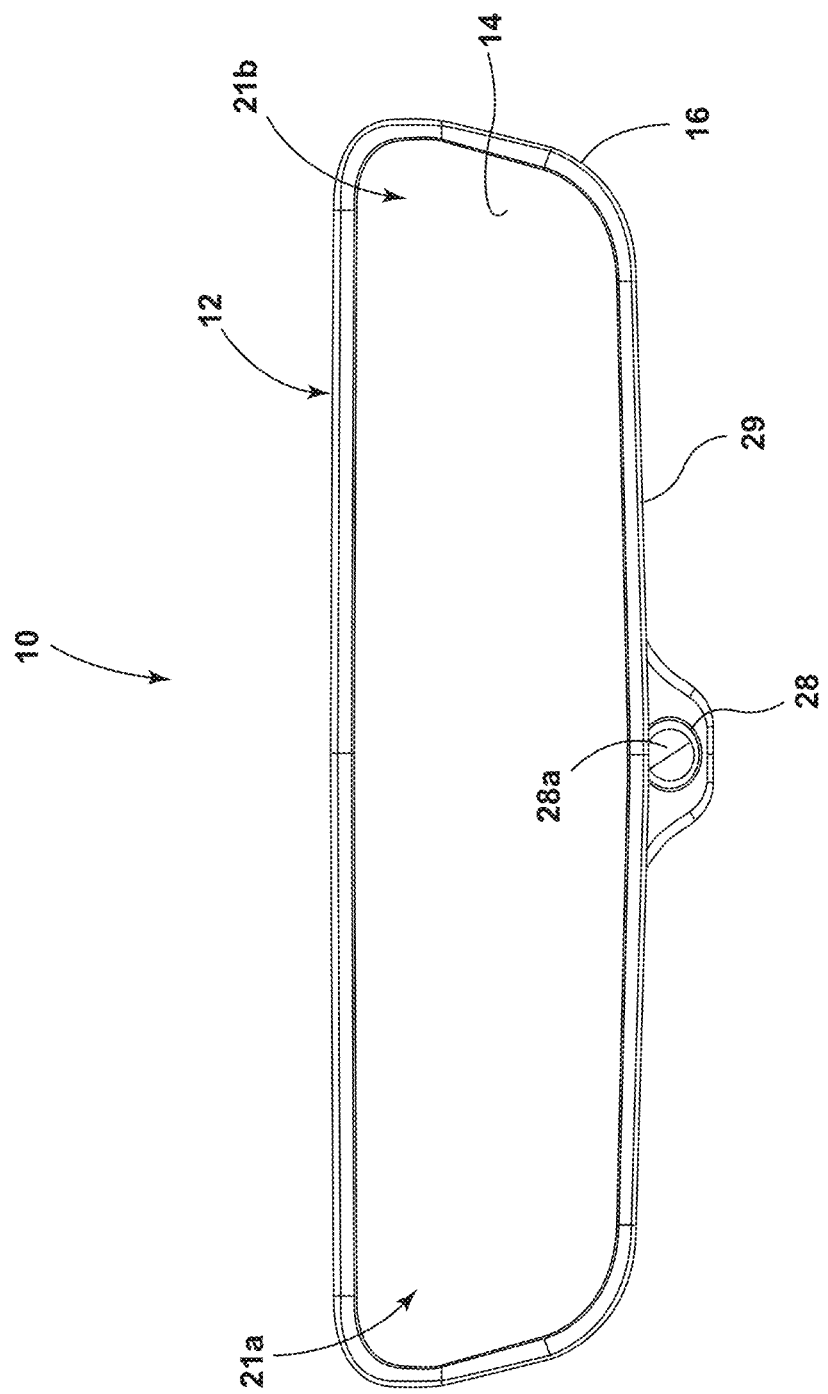
FIG. 1 generally illustrates a front view of an imaging system according to one aspect of the present disclosure.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As defined herein, "approximately" and "about," when used in reference to angles, proportions, and the like, may, in some embodiments, mean within plus or minus ten percent of the stated value. In other embodiments, "approximately" and "about," when used in reference to angles, proportions, and the like, may mean within plus or minus five percent of the stated value. In further embodiments, "approximately" and "about," when used in reference to angles, proportions, and the like, may mean within plus or minus three percent of the stated value. In yet other embodiments, "approximately" and "about," when used with reference to angles, proportions, and the like, may mean within plus or minus one percent of the stated value.

Referring to FIGS. 1-9, reference numeral 10 generally designates an imaging system operable to perform one or more identification functions. An exemplary embodiment of the imaging system 10 is shown incorporated into an interior rearview mirror assembly 12 of an automotive vehicle. The interior rearview mirror assembly 12 may be configured as an electro-optic rearview mirror assembly 12 with a mirror element 14 with a variable transmittance disposed in a housing 16. Though illustrated as incorporated in the mirror assembly 12, it may be understood that one or more components of the imaging system 10 may be incorporated in other portions of the vehicle (e.g., panels, an overhead console, visor, center consoles, a steering wheel 17 (FIGS. 6-9), etc.).

Figure 2:
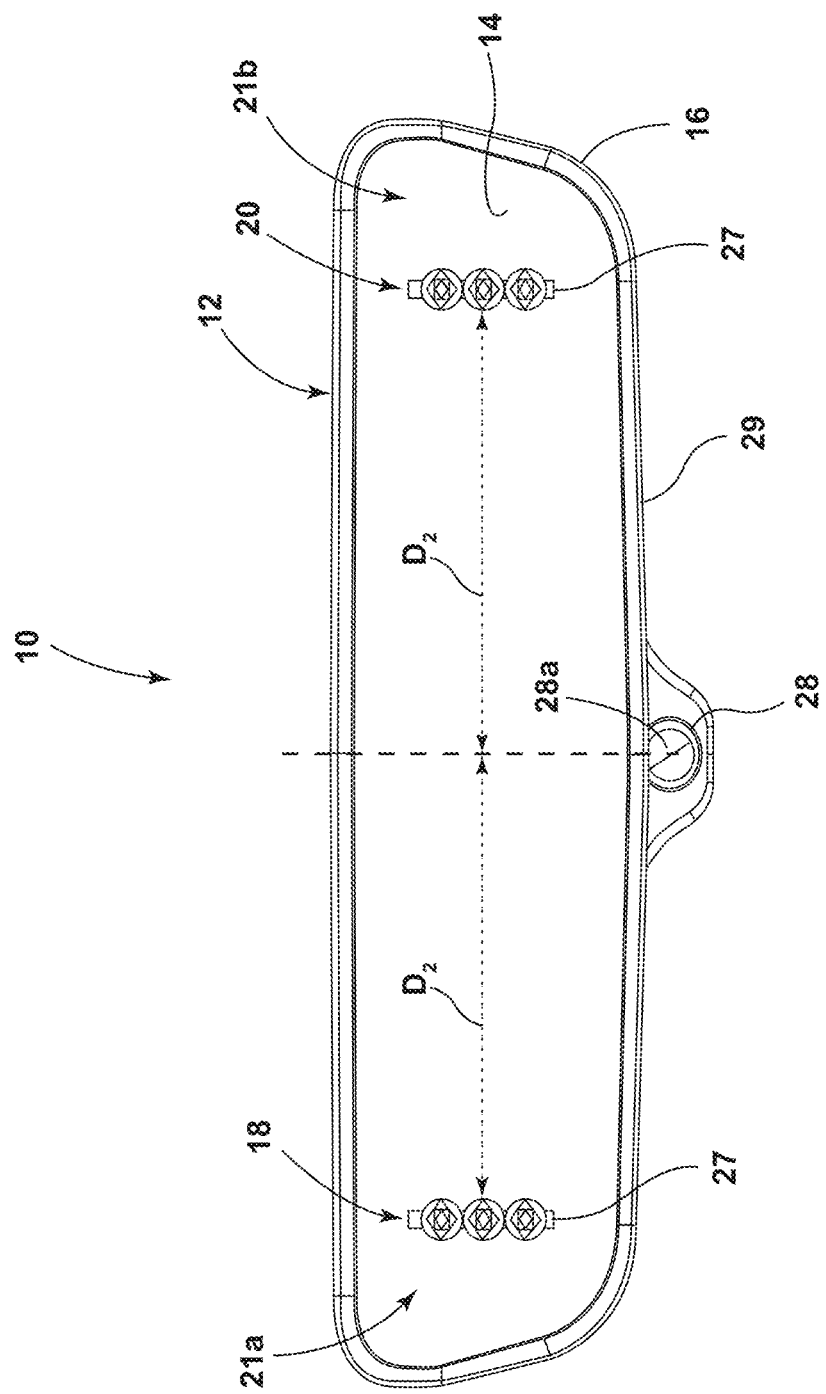
FIG. 2 generally illustrates a front view of an imaging system having light sources incorporated with a rearview assembly according to one aspect of the present disclosure.
Figure 3:
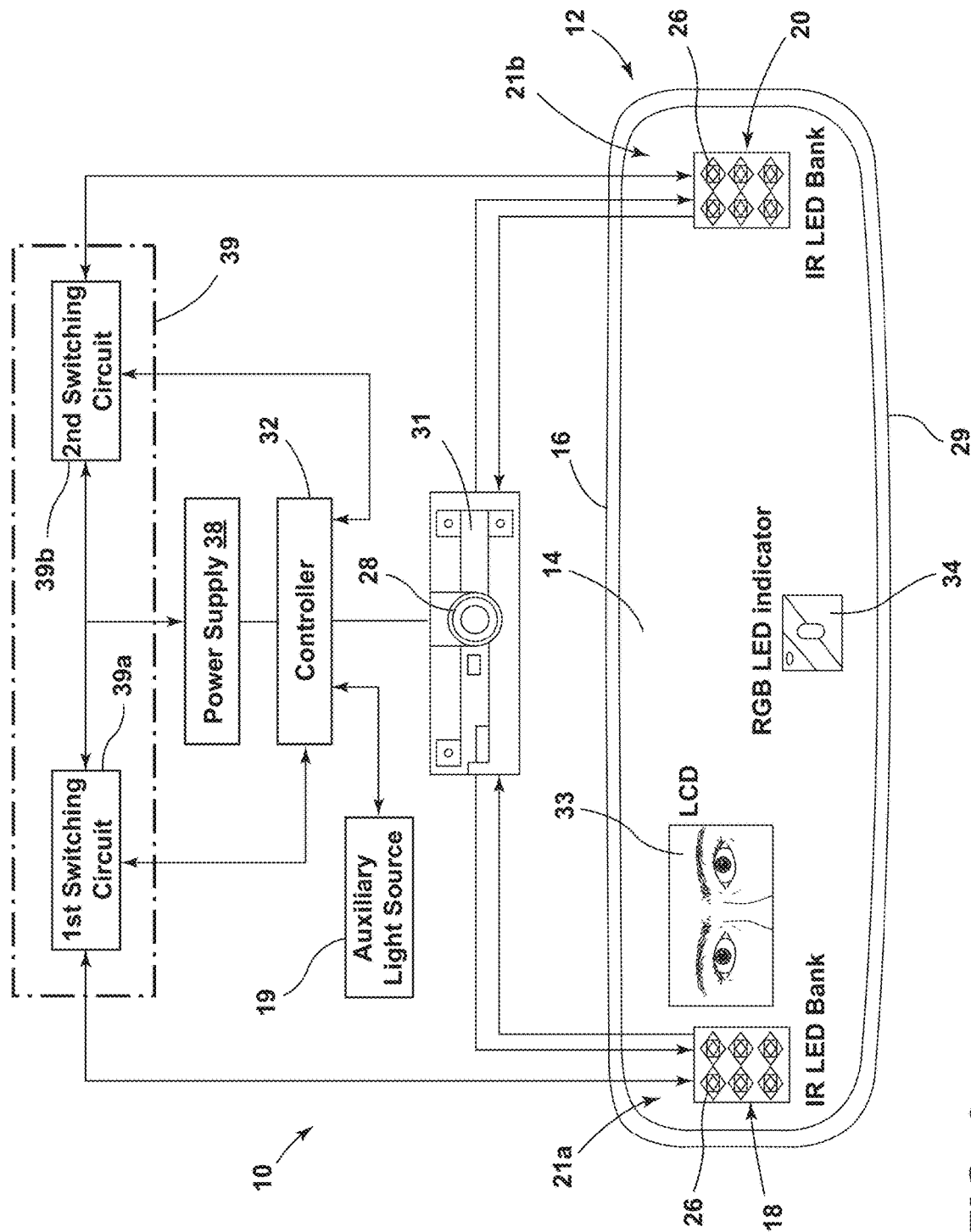
FIG. 3 generally illustrates a schematic view of an imaging system according to one aspect of the present disclosure.
Figure 4:
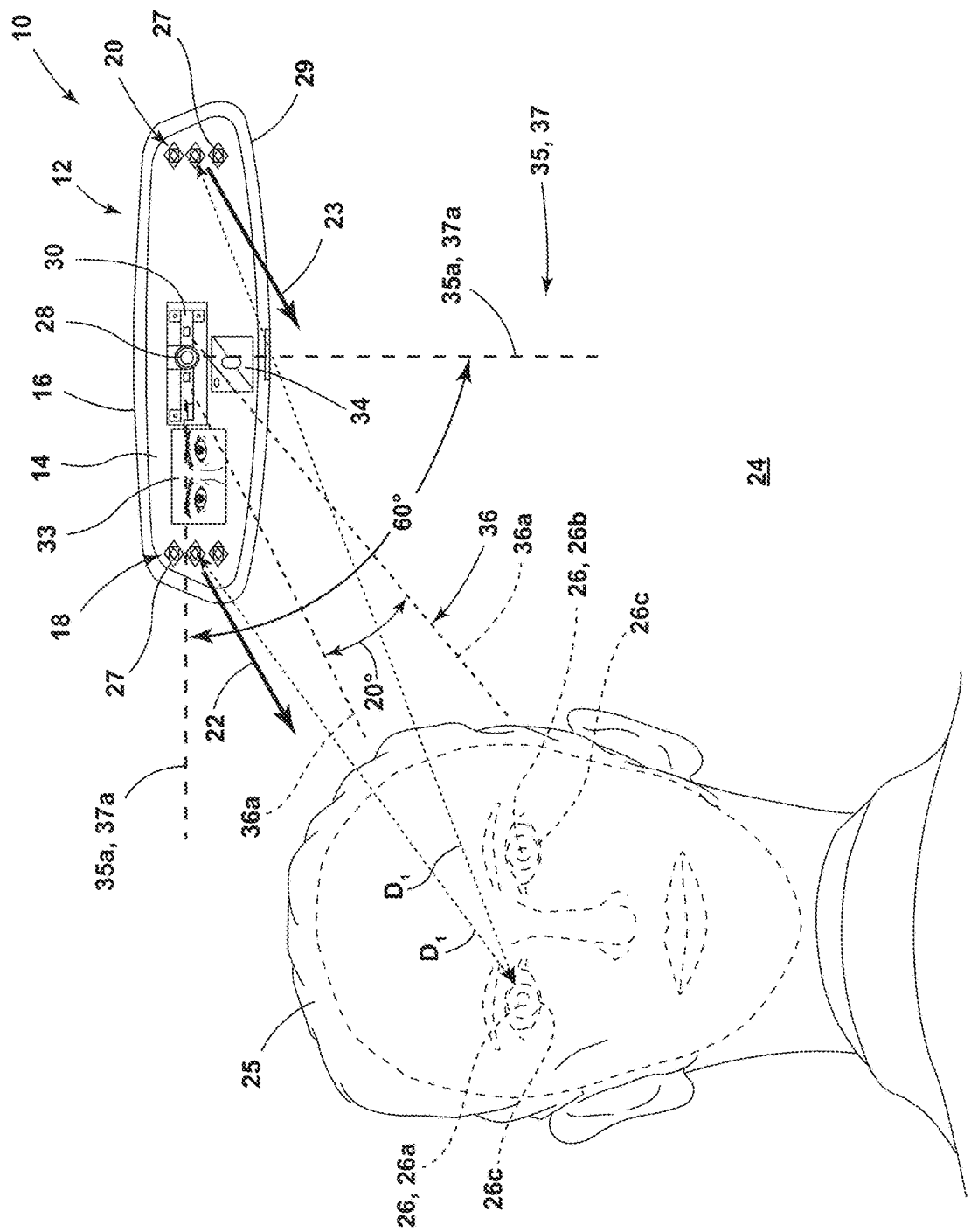
FIG. 4 generally illustrates a perspective view of an imaging system incorporated in an interior rearview mirror assembly according to one aspect of the present disclosure.

As shown in FIGS. 2-4, a first light source 18 and a second light source 20 may be disposed inside the housing 16 concealed behind the mirror element 14. Additionally, in some embodiments, the light sources 18, 20 may be positioned separate from the housing 16 (e.g., in an overhead console, vehicle pillar, etc.), while still providing illumination in a field of view of the imaging system 10. As discussed further herein, one or more auxiliary light sources 19 (FIG. 3), or third light sources, may also be provided in interior structures of the vehicle (e.g., a center console, vehicle seats, a dashboard, etc.), and/or adjacent an outer panel, or wall, of the vehicle, such as a roof or a side wall. The auxiliary light source 19 may be an after-market accessory or incorporated as an integrated assembly of the vehicle. While the first light source 18 is shown located at a first side 21a of the mirror assembly 12 and the second light source 20 is shown at a second side 21b, opposite the first side 21a, it is to be understood that their illustrated positions should not be construed as limiting.

Figure 5:
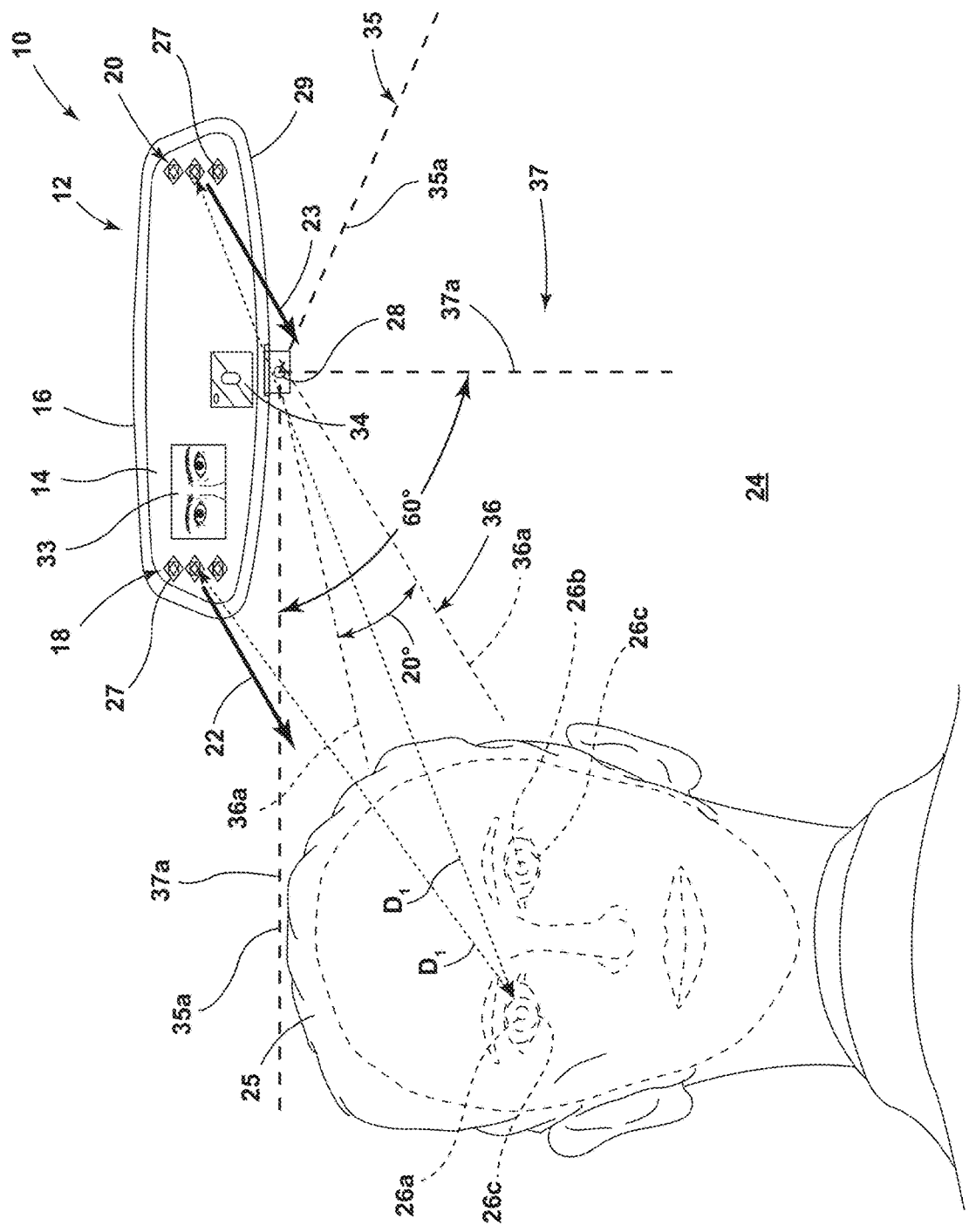
FIG. 5 generally illustrates a perspective view of an imaging system incorporated in an interior rearview mirror assembly according to one aspect of the present disclosure.
Figure 8:
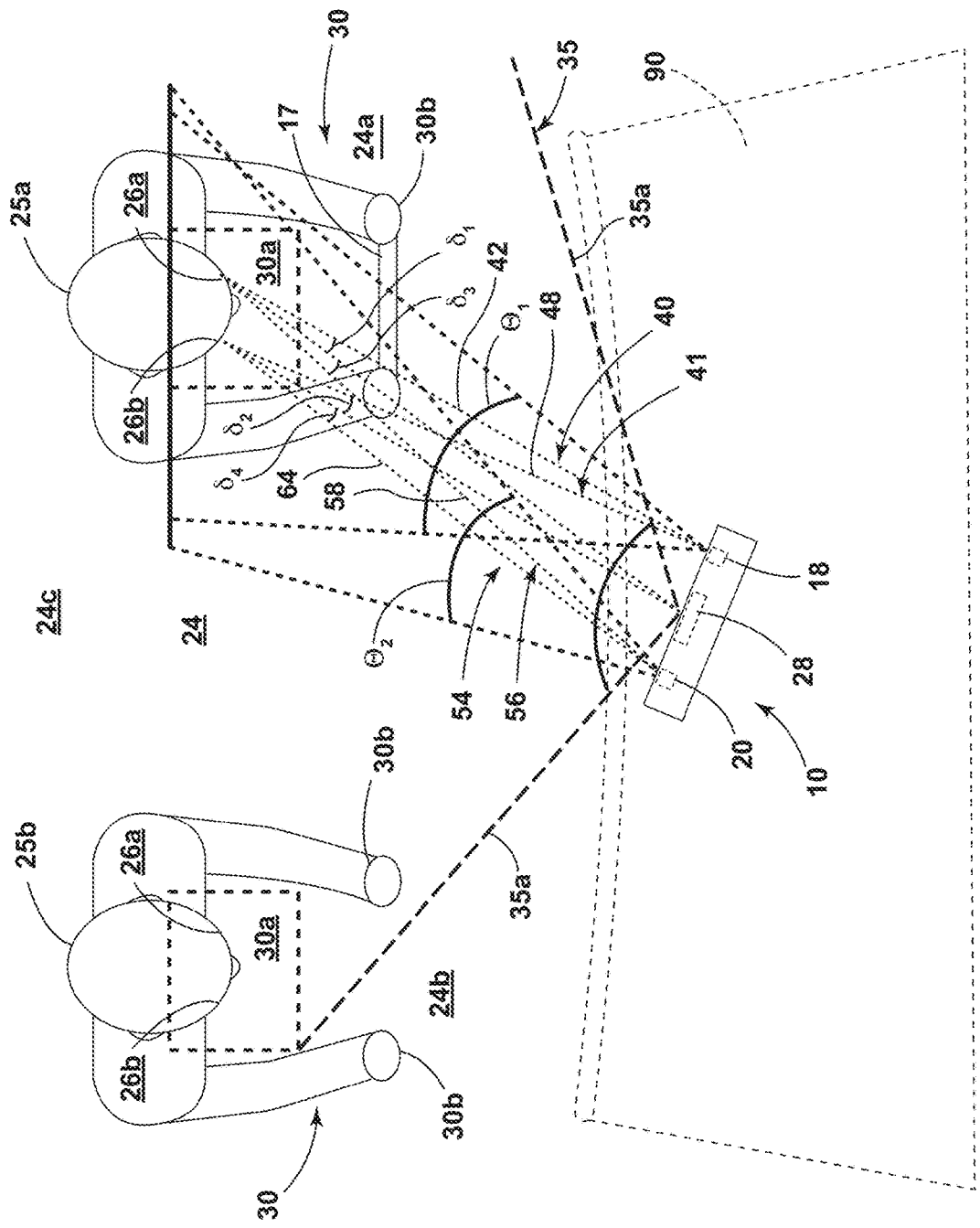
FIG. 8 generally illustrates a top view of an imaging system incorporated in an interior rearview mirror assembly according to one aspect of the present disclosure.
Figure 9:
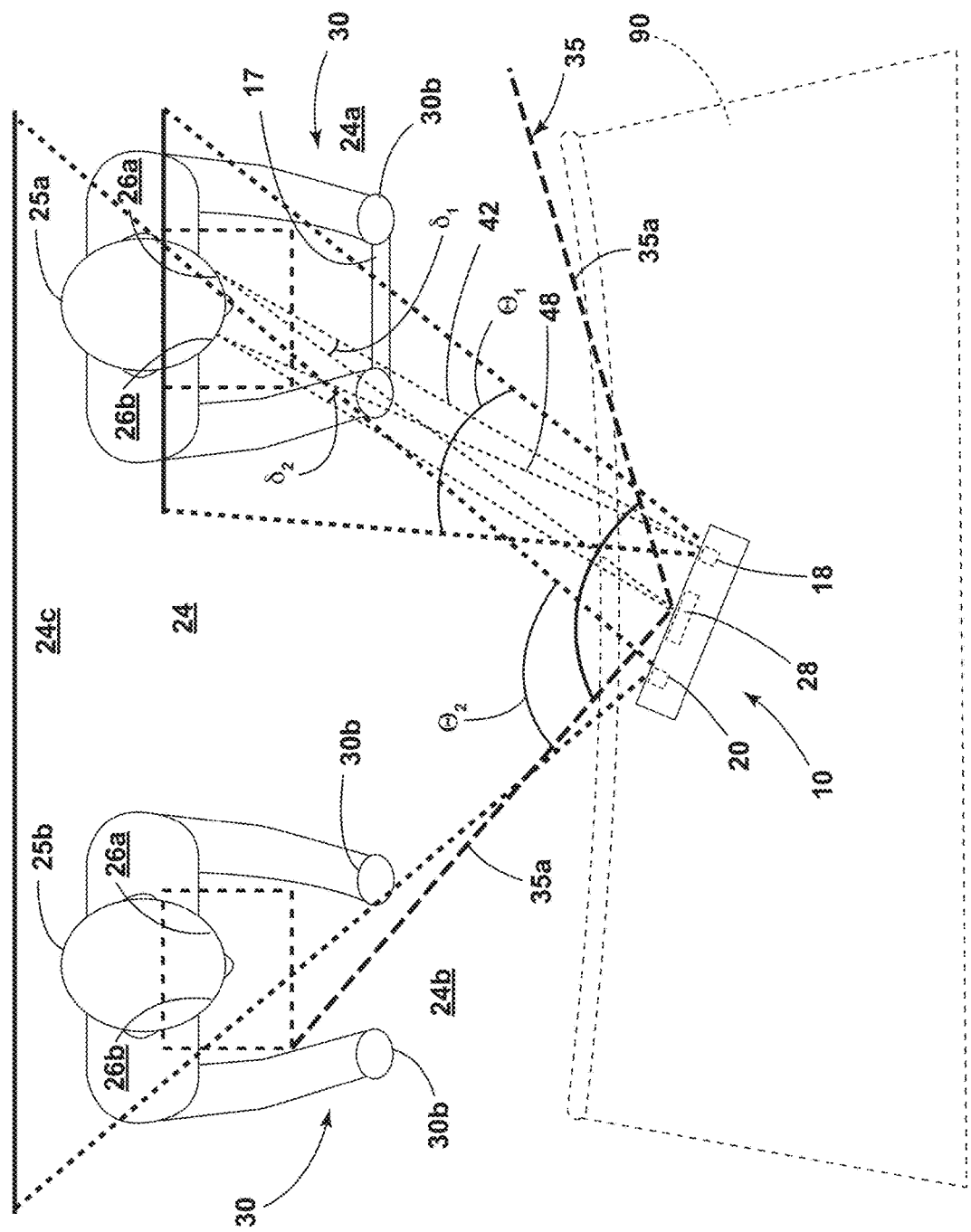
FIG. 9 generally illustrates a top view of an imaging system incorporated in an interior rearview mirror assembly according to one aspect of the present disclosure.

As shown in FIGS. 4 and 5, the first light source 18 is configured to project a first illumination generally represented by arrow 22, and the second light source 20 is configured to project a second illumination generally represented by arrow 23. The first and second illuminations 22, 23 may be projected through the mirror element 14 into a cabin 24 of the vehicle and onto an occupant 25, such as a driver 25a, a front passenger 25b (FIGS. 8-9), or rear passengers. The cabin 24 may include front passenger compartments 24a, 24b, such as a driver compartment 24a and a front passenger compartment 24b (FIGS. 8 and 9). Additionally, a rear passenger compartment 24c (shown in FIGS. 8 and 9) may correspond to a seating location of the rear passengers. The first light source 18 may be spaced by a first distance $D_1$ from a target surface. In some implementations, the target surface may correspond to an eye 26 of the occupant 25. In some implementations, the target surface may correspond to a first target surface 26a and a second target surface 26b, the first and second target surfaces 26a, 26b associated with a first eye 26a and a second eye 26b, respectively, of the occupant 25. In some implementations, the target surface may correspond to an iris 26c of the occupant 25. In general, the first and second illuminations 22, 23 may illuminate one or more features of the occupant 25 to facilitate monitoring or authentication functions.

In some embodiments, the first and second illuminations 22, 23 have the same wavelength. In some embodiments, the first illumination 22 and the second illumination 23 each include a distinct wavelength selected from a near-infrared (NIR) spectrum including wavelengths ranging from 800 nm to 950 nm. The second illumination 23 may have a longer wavelength than the first illumination 22. For example, the first illumination 22 may have a wavelength of about 810 nm and the second illumination 23 may have a wavelength of about 940 nm. Additional examples of the first wavelength and the second wavelength may include the following combinations of the first wavelength/second wavelength as follows: first 860 nm/second 940 nm, first 880 nm/second 940 nm, first 900 nm/second 940 nm, etc. Though specific wavelengths are referenced, it shall be understood that intermediate values and various combinations may be implemented.

As depicted, the first and second light sources 18, 20 may each include one or more infrared emitter banks 27 that emit the first and second illuminations 22, 23, respectively. Each emitter bank 27 may include a plurality of light-emitting diodes (LEDs), which may be grouped in an array or matrix, or otherwise grouped in other arrangements.

An imager 28 may be disposed on an exterior surface of the housing 16 and include a lens 28a for receiving light. As shown in FIGS. 1, 2, and 5, the imager 28 may be centrally disposed on a bottom surface of the housing 16. In this configuration, the imager 28 may be considered "chin-mounted" when extending from an outer edge 29 of the housing 16 (e.g., underneath the mirror element 14). As shown in FIG. 4, the imager 28 may be disposed inside the housing 16 and may be located in a generally central location behind the mirror element 14. In general, the imager 28 may be configured to capture reflected light representative of a biometric feature of the driver 25a and generate image data corresponding to the one or more acquired images. The imager 28 may also be configured to acquire one or more images of the cabin 24 of the vehicle, including images of the front passenger compartments 24a, 24b and/or images of the rear passenger compartment 24c.

As shown in FIG. 2, each of the light sources 18, 20 may be spaced from the imager 28 by a second distance $D_2$. The second distance $D_2$ may correspond to a lateral spacing between the imager 28 and each of the light sources 18, 20. More specifically, the second distance $D_2$ may be measured in a horizontal direction extending laterally across the mirror element along a horizontal field component 35a, which is further discussed in reference to FIGS. 4-9. By laterally spacing one or both of the light sources 18, 20 from the imager 28, the first and/or second illuminations 22, 23 may be configured to reflect off of the eye 26 at an angle that allows eye-tracking and identification functions to be performed by the system 10.

The imager may be configured to capture images of lower seating portions (e.g., proximate to a seat deck). In this way, the field of view 35 of the imager 28 may capture the lower body portion 30 of the occupants 25, such as laps 30a, hands 30b (e.g., driver's hands 30b on the steering wheel 17), torsos 30c, etc., as shown in FIGS. 6-9. By capturing image data in the field of view 35 including the lower seating portions, the imager 28 may be configured to detect, for example, whether a mobile device (smartphone, e.g.) is placed on or around the driver's lap 30a.

The imager 28 to capture images of occupants over a wide range of heights, for example from 1300 mm to 2200 mm, from 1500 mm to 2000 mm, 1600 mm to 1900 mm, etc. The position of the imager 28 may also limit the effect of distortion along edges of the lens 28a of the imager 28. According to some aspects of the present disclosure, the imager 28 is operable to capture a width of the cabin 24. Stated differently, a width of the field of view 35 of the imager 28 may exceed a distance between the front passenger 25b and the driver 25a along the width of the cabin 24. By capturing a wide field of view encompassing a front portion of the cabin 24 (e.g., back portions of driver and passenger seats), the inherent distortion at the edges of the lens 28a may occur beyond the front passenger 25b and the driver 25a (e.g., proximate to front side doors of the vehicle). This may limit poor image quality adjacent portions of the occupants 25, such as the face, eyes 26a, 26b, torsos 30c, and laps 30a of the occupants 25.

Referring now to FIG. 3, the imager 28 may be in electrical communication with a printed circuit board (PCB) 31 and in communication with a controller 32. The controller 32 may include one or more processors configured to process image data received from the imager 28 to monitor/identify the driver 25a, the front passenger 25b, and/or the rear passenger. In operation, the controller 32 and/or a processor of the imager 28 may be operable to process image data corresponding to an image of the occupant 25 to identify one or more body parts of the occupant 25 via a first algorithm. For example, the controller 32 may execute the first algorithm to identify the lap 30a, hands 30b, torso 30c, shoulders, neck, and/or face of the occupant 25. The first algorithm may be trained and/or programmed with images of various forms of each body part in different positions.

Additionally, the controller 32 may be configured to execute a second algorithm operable to determine a pose of the occupant 25. The controller 32 may be configured to associate the pose with a distracted state of the occupant 25. For example, the controller 32 may execute the second algorithm to classify the occupant's neck arching downwardly and/or the occupant's head tilted forwardly as a "looking down" pose. The controller 32 may associate the looking down pose with a distracted state of the occupant 25 based on historical data, pre-programming, and/or iterative training. Additionally, or alternatively, the controller 32 may execute the second algorithm to classify one or both hands 30*b* of the occupant 25 on the lap 30*a* of the occupant 25 with a "hands-off-of-wheel" pose. The controller 32 may associate the hands-off-of-wheel pose with the distracted state of the occupant 25.

The controller 32 may also be operable to execute a third algorithm configured to track motion of one or more body parts of the occupant 25. For example, by employing one of the first and second algorithms in parallel with the third algorithm, the controller 32 may determine the distracted state based on finger movement of one or both hands 30*b* of the occupant 25 by associating finger movement with mobile device interaction (e.g., typing/texting). The controller 32 may also be operable to detect a mobile device based on light projected from or reflected off of the mobile device via a fourth algorithm. For example, the controller 32 may execute the fourth algorithm to analyze image data generated based on infrared light or visible light to identify pixel data of the image data that corresponds to higher luminosity. It is generally contemplated that the controller 32 may be operable to combine one or more of the algorithms to detect the distracted state.

The controller 32 may be operable to detect and/or categorize any number of distracted states based on a projected level of distraction of the occupant 25. For example, the controller 32 may determine a first distracted state in response to a combination of factors identified by the algorithms or detection routines of the controller 32. For example, the controller 32 may detect a first distracted state in response to a combination of the occupant 25 looking down or a hands-off-of-wheel pose in combination with a moving or typing motion on the mobile device. In such cases, the field of view 35 may provide for image data depicting the mobile device in the lap 30*a* or lower seating portion as previously described. In some cases, the controller 32 may determine a second distracted state corresponding to the hands-off-of-wheel pose. The controller 32 may be configured to then categorize the first distracted state with a first level of distraction and categorize the second distracted state with a second level of distraction. In the above example, the controller 32 may determine that the first level of distraction is greater than the second level of distraction. The controller 32 may then generate a response signal based on the level of distraction of the occupant 25. The response signal may be operable to control various functions (e.g., the function depending on the level of distraction) in the cabin 24 to alert the occupant 25 of a distracted state.

In some implementations, the controller 32 may be configured to detect an eye glint of the occupant 25 and/or a pupil of the occupant 25 to determine focal direction data corresponding to a focal direction of the eye 26. The controller 32 may then incorporate the focal direction data into any one of the first, second, third, or fourth algorithms to determine one or more distracted states. The eye glint may be identified as the brightest specular reflection of visible or infrared light from an outer surface of a cornea of the eye 26 of the occupant 25. The eye glint may occur at a position of the outer surface of the cornea that overlaps the iris 26*c* and may be identified by its contrast to surrounding portions of the image. By tracking the focal direction of the occupant 25, the controller 32 may be configured to detect a direction in which the occupant 25 is looking and may identify or infer a level of distraction based on this information, alone or in combination with other factors. The imager 28 may be operated by the controller 32 to adjust an exposure time (e.g., lessen the exposure time) when one or both light sources 18, 20 are operating for the detection of eye glint.

By way of example, the controller 32 may incorporate eye-tracking functions to determine whether the driver 25*a* is looking toward the mobile device and/or away from the front of the vehicle. For example, the controller 32 may be operable to receive image data corresponding to an image of the lower body portion 30 and determine a first condition corresponding to the presence of the mobile device on or near the lower body portion 30. Further, the controller 32 may be operable to determine a second condition corresponding to a focal direction of the eye 26 and determine, based on the first condition and the second condition, the distraction level corresponding to the occupant 25 viewing the mobile device. The second condition may also, or may alternatively, be detected in response to the controller 32 determining the presence of the mobile device based on the image data. For example, the controller 32 may determine that the occupant 25 is looking at and/or interacting with the mobile device.

As shown in FIG. 3, the controller 32 may communicate with a display 33 disposed inside the housing 16 of the interior rearview mirror assembly 12 and visible through the mirror element 14. The controller 32 may be configured to operate the display 33 to show image data received from the imager 28. The display 33 may be configured as an LCD, LED, OLED, plasma, DLP, or other display type. Examples of displays that may be utilized are disclosed in U.S. Pat. No. 6,572,233, entitled "REARVIEW MIRROR WITH DISPLAY," U.S. Pat. No. 8,237,909, entitled "VEHICULAR REARVIEW MIRROR ASSEMBLY INCLUDING INTEGRATED BACKLIGHTING FOR A LIQUID CRYSTAL DISPLAY (LCD)," U.S. Pat. No. 8,411,245, entitled "MULTI-DISPLAY MIRROR SYSTEM AND METHOD FOR EXPANDED VIEW AROUND A VEHICLE," and U.S. Pat. No. 8,339,526, entitled "VEHICLE REARVIEW MIRROR ASSEMBLY INCLUDING A HIGH INTENSITY DISPLAY," all of which are incorporated herein by referenced in their entirety.

In some implementations, the controller 32 may also be operable to access biometric data and/or driving metric data associated with the driver 25*a*. The controller 32 may be configured to communicate an instruction to output the biometric data and/or driving data to the display 33 depending on an operating state, or gear status (e.g., park, drive, reverse, etc.), of the vehicle. The controller 32 may communicate with a powertrain system controller to determine the operating state of the vehicle. For example, the controller 32 may determine the vehicle is in park and communicate the instruction to the display 33 to indicate the biometric and/or driving metric data. The biometric data may include a duration of the blink of the eyes 26*a*, 26*b*, a dilation of the pupils, a body pose of the driver 25*a*, and/or any other biometric feature that may be used to determine a health status of the driver 25*a*.

The controller 32 may also be configured to receive vehicle operation data corresponding to speed, acceleration, deceleration, brake force, proximity to other vehicles, etc., and generate the driving metric data based on the vehicle operation data. The vehicle operation data may be communicated to the controller 32 from the powertrain system controller or another on-board vehicle controller that tracks driving operations. The driving metric data may be communicated to the driver 25a via the display 33 in the form of a numerical score (e.g., 8/10), descriptive verbiage (e.g., "Very Good"), or the like.

With continued reference to FIG. 3, the first light source 18 and the second light source 20 may be in electrical communication with the PCB 31 and in communication with the controller 32. The controller 32 may be located on the PCB 31, elsewhere located in the housing 16, or elsewhere located in the vehicle. The controller 32 may further be in communication with various devices incorporated in the interior rearview mirror assembly 12 and/or equipment of the vehicle. The controller 32 may include one or more processors configured to selectively activate the first and second light sources 18, 20. The third light source 19 disposed within the cabin 24 (e.g., an overhead light disposed in a roof of the vehicle, a light disposed in a side panel of the vehicle, etc.) may be employed to illuminate at least a portion of the cabin 24 to supplement light provided by one or both of the first and second light sources 18, 20. The third light source 19 may also be in electrical communication with the controller 32, such that the controller 32 may operate the third light source 19 based on an amount of light detected in the cabin 24.

In some cases, the controller 32 may provide visual notifications indicating an operating state of the imaging system 10. The notifications may be communicated via the display 33 or an indicator 34 configured to output a visual notification indicating an operating state of the imaging system 10. The indicator 34 may be configured as an LED or other light source and is operable by the controller 32 to flash and/or change colors to indicate the operating state of the imaging system 10. In one specific embodiment, the indicator 34 may be configured as an RGB LED operable to indicate the operating state by emitting light expressed in a red color, a green color, a blue color, or any color combination thereof. The controller 32 may be operable to communicate an instruction to control the indicator 34 to indicate a warning condition. In this way, the imaging system 10 may be configured to alert the driver 25a when the controller 32 detects the one or more distracted states.

Each of the first and second light sources 18, 20 may be uniquely associated with an identification function executed by the controller 32. The first identification function may be an iris scanning function to identify the occupant 25 (e.g., the driver 25a). According to the first identification function, the controller 32 may activate the first light source 18 to project the first illumination 22 toward the driver 25a. In some cases, the controller 32 may activate the first light source 18 without the second light source 20 or activate each of the light sources 18, 20 sequentially. As discussed herein, the first illumination 22 may be a NIR illumination having a wavelength in the range of about 810 nm to 880 nm. For example, the first illumination 22 may have a wavelength of 810 nm, of 860 nm, or of 880 nm.

In order to accurately identify the features of the occupant 25 (e.g., occupant pose, gaze direction, body movements, etc.), the system 10 may adjust an operation based on ambient lighting conditions of the vehicle. For example, the controller 32 may adjust various imaging parameters (e.g., an auto gain threshold) to determine characteristics (e.g., wavelength, intensity, etc.) of the first and/or the second illumination 22, 23. In embodiments where the interior rearview mirror assembly 12 is configured as an electro-optic rearview mirror assembly 12, the controller 32 may additionally, or alternatively, use available feedback mechanisms from a dimming controller to determine the characteristics of the first and/or the second illumination 22, 23. In these embodiments, the transmissive properties of an electro-optic element in the mirror assembly 12 may be configured to filter the first or the second wavelengths corresponding to the first and second illuminations 22, 23. For example, the electro-optic element may be activated to filter out visible light projected from the first light source 18 while allowing IR light or NIR light generated by the second light source 20 to pass through the electro-optic element, or vice versa. Additionally, or alternatively, a first electro-optic element overlaying the first light source 18 may be electrically isolated from a second electro-optic element overlaying the second light source 20. In this way, the first electro-optic element may be activated to filter light projected from the first light source 18 while light projected from the second light source 20 remains unfiltered by the second electro-optic element.

Further to adequate lighting conditions of the vehicle, the imaging system 10 may be configured to include manual entry criteria that may improve occupant detection algorithms in the controller 32. For example, eye color and/or skin color may aid the controller 32 in determining the characteristics (e.g., intensity, frequency, etc.) of the first and/or the second illumination 22, 23. The criteria may be entered using any available user-input device of the vehicle or a mobile device in communication with the controller 32. By employing one or more of the foregoing features, the imaging system 10 may benefit from improved speed and accuracy with respect to biometric capture and/or user authentication.

To operate the first light source 18 independently from the second light source 20, power signals supplied to the first light source 18 may have different properties than power signals supplied to the second light source 20. For example, with continued reference to FIG. 3, a single power supply 38 may be employed in electrical communication with the first and second light sources 18, 20. Switching circuitry 39 may interpose one or both of the first and second light sources 18, 20 for stepping down a voltage, or otherwise modifying electrical properties of a signal provided to one or both of the first and second light sources 18, 20. For example, a first switching circuit 39a may provide high-voltage (or high-current) pulses to the light source associated with eye glint and/or facial detection, and a second switching circuit 39b may provide a continuous current supply to the light source associated with cabin monitoring. As illustrated, the controller 32 may be in electrical communication with the switching circuitry 39 for controlling the first and second switching circuits 39a, 39b. Alternatively, two individual power supplies may be provided, with a first power supply in communication with the first light source 18 and a second power supply in communication with the second light source 20.

Referring now to FIGS. 4-8, the controller 32 may operate the imager 28 with a field of view 35 that captures both a face of the driver 25a and the cabin 24 more broadly. In this way, events occurring in the cabin 24 may be tracked simultaneously with facial features, which may allow the system 10 to better determine whether the driver 25a is distracted and identify the cause of the distraction. The field of view 35 may allow the imager 28 to capture images of identifying features of the cabin occupants 25. The field of view 35 may encompass a full width of the vehicle (e.g., from a driver door to a front passenger door). The field of view 35 may allow the imager 28 to capture image data corresponding to images of occupant devices/body parts (e.g., arms and legs, clothing, and wearable or non-wearable devices). The field of view 35 may allow the imager 28 to capture images of vehicle features (e.g., vehicle seats, a center console, the steering wheel 17, a dashboard, seatbelts, side windows of the vehicle, a rear window of the vehicle, etc.). The field of view 35 may allow the imager 28 to capture images of objects outside of the vehicle (e.g., objects viewable via the side and rear windows).

The field of view 35 may have a horizontal field component 35a in the range of approximately 120° to 160° and a similar or different vertical field component 35b. The horizontal field component 35a may be in the range of about 135° to 150°. The horizontal and vertical field components 35a, 35b may approximate a width and a height of the field of view 35, respectively, for a given depth (e.g., a distance from the imager 28 in a direction normal to the center of the lens 28a). For example, at a depth of about 500 mm, the field of view 35 may encompass the width of the cabin 24 and the height of the cabin 24. The depth at which the field of view 35 encompasses the width and/or height of the cabin 24 may be less than 500 mm (e.g., 300 mm) or greater than 500 mm (e.g., 600 mm). Stated differently, the angle of the horizontal field component 35a may allow the imager 28 to be operable to capture the full width of the cabin 24 at the first distance $D_1$ from the imager 28 (e.g., a depth of the field of view 35 of approximately 500 mm).

The field of view 35 may have a generally arcuate shape (e.g., elliptical) or a squared-off shape (e.g., rectangular). The range of the field of view 35 may be dependent on optical properties of the lens 28a of the imager 28. Stated differently, the size and quality of the lens 28a may determine how expansive the field of view 35 is. By way of example, a field of view 35 having a horizontal field component 35a of 120° and a vertical field component 35b of 120° may have a regular polygonal or circular shape. If the field of view 35 has a horizontal field component 35a of 120° and a vertical field component 35b of 90°, then the field of view 35 may have an irregular polygonal or elliptical shape.

Referring more particularly to FIGS. 4 and 5, the field of view 35 may include a first portion 36 and a second portion 37. The first and second portions 36, 37 may provide for image data that focuses on different areas of interest in the cabin 24. In this way, areas of interest representative of the level of distraction of the occupant 25 may be better captured (e.g., higher levels of detail and/or resolution in particular regions of the field of view 35). The field of view portions 36, 37 may be different sizes and/or shapes, and may or may not overlap one another. The second portion 37 may be larger than the first portion 36 and operable to encompass the width and/or height of the cabin 24, and the first portion 36 may be operable to encompass an area corresponding to the face of the driver 25a. Alternatively, the first portion 36 and the second portion 37 may each encompass a focal region corresponding to the face of the driver 25a.

The first portion 36 includes a first horizontal field component 36a and a first vertical field component (not numbered). The second portion 37 includes a second horizontal field component 37a and a second vertical field component (not numbered). The shape of the first portion 36, as defined by its field components (e.g., the first horizontal field component 36a and the first vertical field component), may or may not be proportional to the second portion 37, as defined by its field components (e.g., the second horizontal field component 37a and the second vertical field component).

Still referring to FIGS. 4 and 5, the first portion 36 may be directed to a focal region common to an illuminated region encompassed by a first illumination range $\Theta_1$ of the first illumination 22. The first light source 18 may be operable to direct the first illumination 22 toward an area corresponding to a face of the driver 25a to illuminate the face of the driver 25a. The first light source 18 may be operable to produce high-intensity light within the first illumination range $\Theta_1$ of, for example, about 20° (e.g., horizontally and/or vertically) in order to illuminate the face of the driver 25a. The remaining range of the first illumination 22 may be distributed to an area surrounding the face, such as the lower body portion 30. The potential distribution of the first illumination 22 is described later in particular reference to FIGS. 6-9.

The second portion 37 may be directed to a focal region common to an illuminated region encompassed by a second illumination range $\Theta_2$ of the second illumination 23. The second light source 20 may be operable to direct the second illumination 23 toward an area corresponding to the cabin 24 of the vehicle to illuminate driver and passenger compartments 24a, 24b, 24c of the vehicle. The second light source 20 may be configured to produce high-intensity light within the second illumination range $\Theta_2$ of, for example, about 120° (e.g., horizontally and/or vertically) in order to illuminate the cabin 24 of the vehicle. The remaining range of the second illumination 23 may be distributed to peripheral areas (e.g., walls, side windows, etc.) of the vehicle. The potential distribution of the second illumination 23 is described later in particular reference to FIGS. 6-9.

Figure 6:
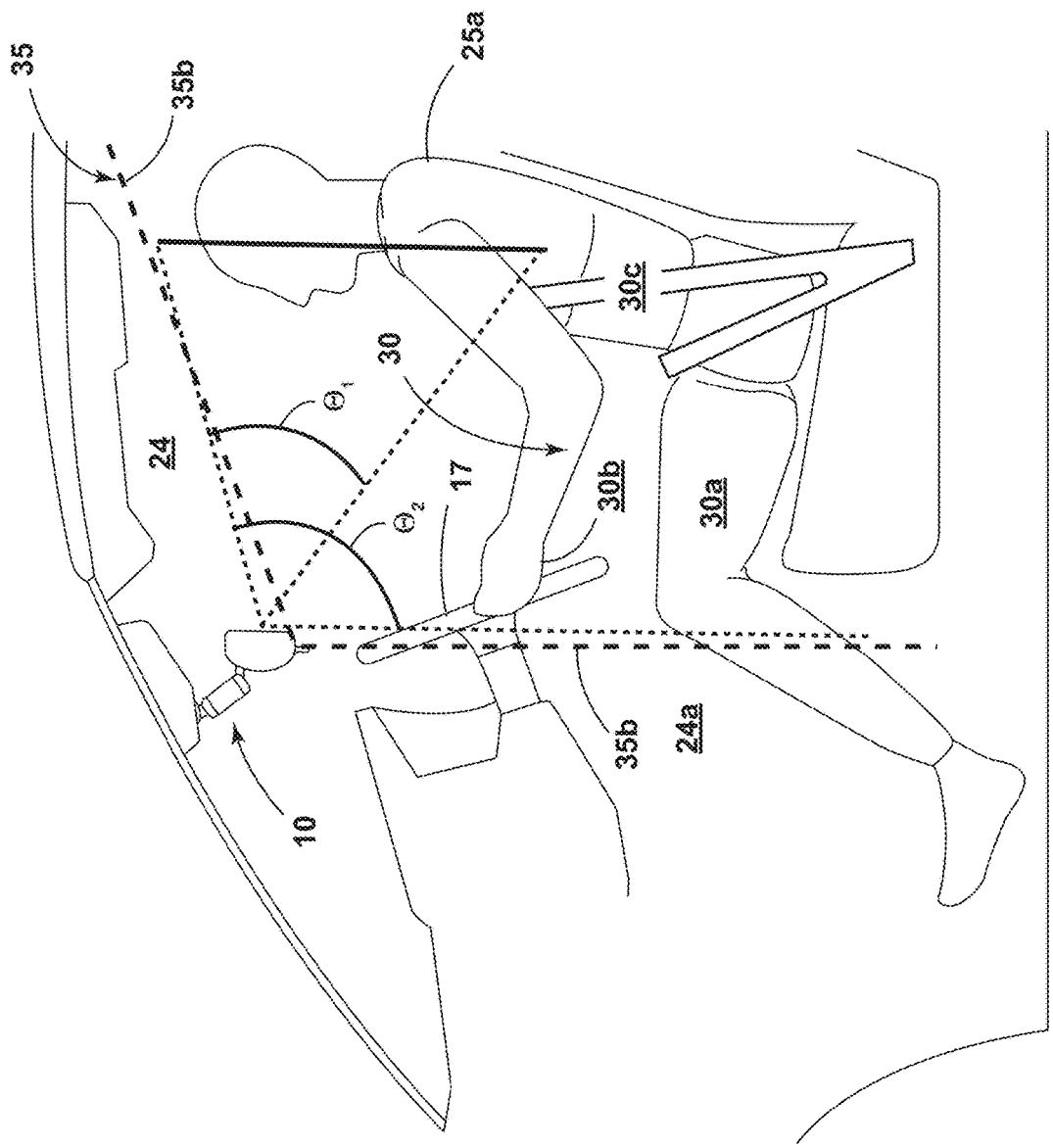
FIG. 6 generally illustrates a side view of an imaging system incorporated in an interior rearview mirror assembly according to one aspect of the present disclosure.
Figure 7:
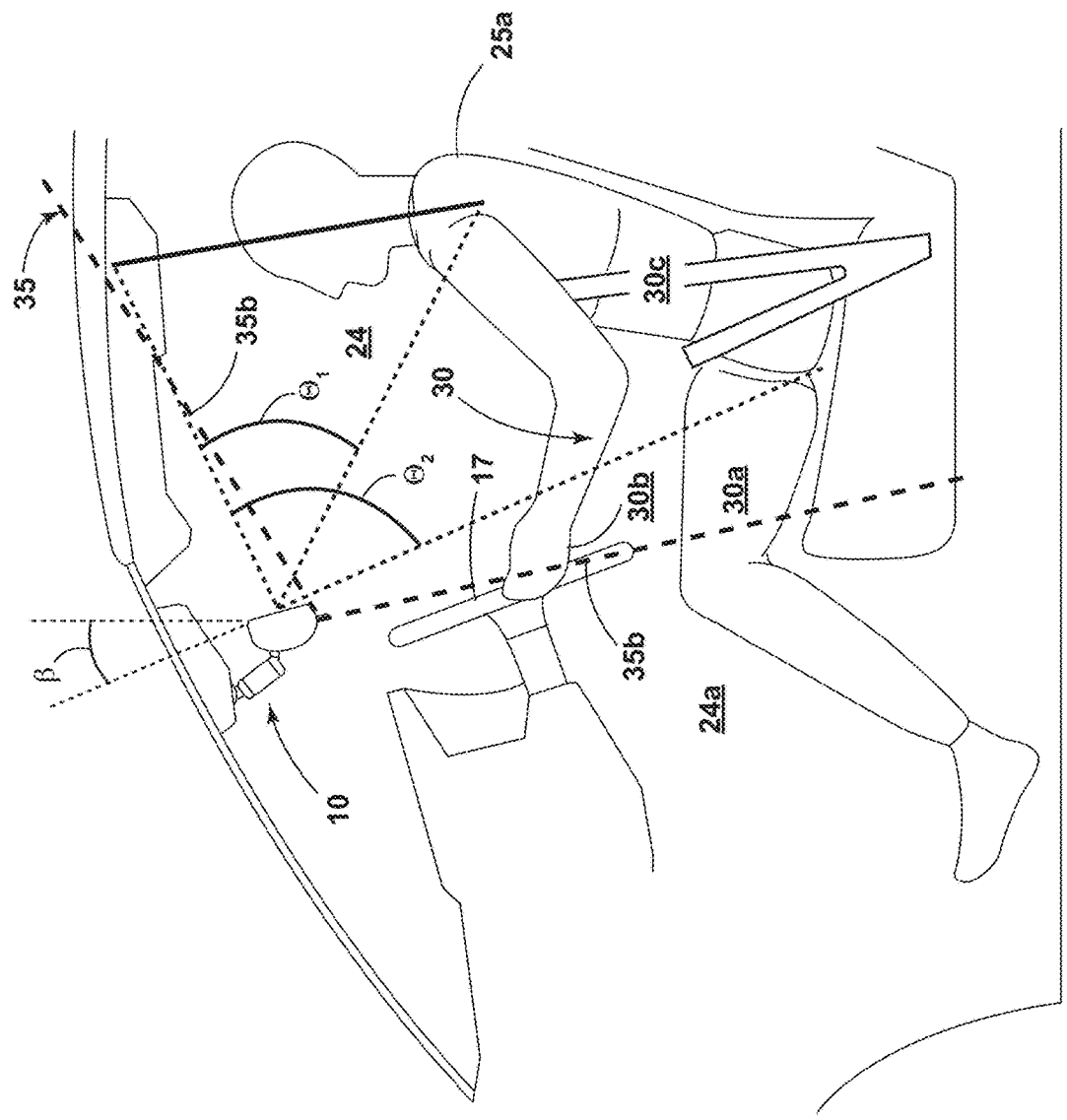
FIG. 7 generally illustrates a side view of an imaging system incorporated in an interior rearview mirror assembly according to one aspect of the present disclosure.

Referring to FIGS. 6 and 7, the field of view 35 of the imager 28 may be in the range of about 120° to 160°. More particularly, the field of view 35 may be in the range of about 140° to 160° to capture undistorted image data of outer portions (e.g., side doors) of the cabin 24 that is typically distorted (e.g., curved or bowed) due to optical aberration. Having an expansive field of view (e.g., in the range of about 120° to 160°) may allow for detection of the occupants 25, drowsiness of the occupants 25, distraction of the occupants 25, a source of distraction, etc. Furthermore, the field of view 35, may allow capture of images of occupant leg-room compartments. For example, the vertical field component 35b may be configured to capture the lower body portion 30 of the occupant 25. With reference to FIGS. 6 and 7 more particularly, the imaging system 10 may leverage a mounting angle ß to capture images of varying ranges of the cabin 24. The mounting angle ß of the mirror assembly 12 may be manually adjusted to attain an image of the driver's eyes 26.

The first portion 36 of the field of view 35 may be employed for identification and/or authentication functions. For example, the controller 32 may operate the imager 28 with the first portion 36 to enable image acquisition of an iris 26c of one or both eyes 26 of the driver 25a. The controller 32 may process image data generated by the imager 28 while operating with the field of view 35 to identify the driver 25a. According to some aspects of the disclosure, the horizontal field component 36a may be approximately 20° and the first vertical field component (not numbered) may be similar or different. As previously illustrated in FIGS. 3-5, image data generated by the imager 28 may be shown on the display 33. Using the display 33 as a reference, the driver 25a may adjust the position of the interior rearview mirror assembly 12 (e.g., the mounting angle ß) such that the image appearing on the display 33 is properly trained on the necessary biometric feature (e.g., iris 26c) required to identify the driver 25a. Driver identification may be used alongside vehicle security features to authorize financial transactions.

For example, changing gears or igniting an engine of the vehicle may be prevented based on a determination that the occupant 25 is not an authorized driver 25a of the vehicle. The controller 32 may determine whether the driver 25a is authorized by processing the image data to identify the driver 25a according to biometric features. To capture the biometric features of the occupant 25, the controller 32 may employ a second identification function, or a driver monitoring function that includes facial recognition, that may activate the second light source 20, without additional illumination, to project the second illumination 23 onto the driver 25a. As discussed herein, the second illumination 23 may be a NIR illumination having a wavelength of approximately 940 nm. In some embodiments, when activating only the second light source 20, the controller 32 also may operate the imager 28 with the second portion 37 to enable image acquisition of a face and/or body of the driver 25a.

The controller 32 may process image data generated by the imager 28 while operating with the second portion 37 to monitor the driver 25a. The second portion 37 may be a wide field of view. The second horizontal field component 37a may be approximately 60° and the second vertical field component (not numbered) may be similar or different. As described herein, image data generated by the imager 28 may be shown on the display 33 and the driver 25a may adjust the position of the interior rearview mirror assembly 12 such that the image appearing on the display 33 is properly trained on the necessary biometric feature (e.g., face and/or body) required to monitor the driver 25a. Driver monitoring may include monitoring for sleepiness, inattentiveness, and other driver states. Additionally, the imager 28 may be configured to capture image data in the second portion 37 to provide for an occupancy detection (e.g. passenger occupancy) or detection of various objects in the cabin 24 of the vehicle.

As shown in FIGS. 6-9, the system 10 may project light into two or more separate or overlapping portions of the cabin 24 to illuminate the first and second portions 36, 37 of the field of view 35. In this way, images of the face and body of the driver 25a, the front passenger 25b, and/or the rear passengers may be captured. For example, both the first and second light sources 18, 20 may be operable to illuminate the driver 25a, as shown in FIG. 8. Alternatively, as shown in FIG. 9, the first light source 18 may be operable to illuminate the driver 25a, and the second light source 20 may be operable to illuminate the passenger compartments 24a, 24b, 24c. The first and second light sources 18, 20 may employ the first and second illumination ranges $\Theta_1$, $\Theta_2$, respectively, to illuminate particular areas of interest captured in the field of view 35. The first and second illumination ranges $\Theta_1$, $\Theta_2$ may each be part of a larger illumination range generated by the light sources 18, 20.

According to aspects of the present disclosure, the first illumination range $\Theta_1$ and the second illumination range $\Theta_2$ each may be formed via a collimating lens associated with each light source 18, 20 configured to generate a focused pattern of light. For example, the intensity of the light emitted from the light sources 18, 20 may vary over the distribution of a light beam pattern (e.g., higher central intensity, gradient distribution, etc.). In this way, a certain percentage of the light energy generated by the light sources 18, 20 may be relegated or controlled to project over a specific range of illumination and corresponding portions of the cabin 24 of the vehicle. By way of example, the distribution of light from the light sources 18, 20 may follow the pattern of a full width at half maximum (FWHM) distribution, where half of the light produced by the light source 18, 20 is within a specific range, and the other half may be distributed in a remaining range, typically with the total range approximating 180°.

With continued reference to FIGS. 6-9, the first illumination range $\Theta_1$ and the second illumination range $\Theta_2$ may encompass specific portions of the field of view 35 to allow the imager 28 to capture image data employed for recognition software. Similar to the corresponding field of view 35, the second illumination range $\Theta_2$ may be larger than the first illumination range $\Theta_1$. For example, the second light source 20 may employ a more powerful infrared emitter bank 27 or a light source with a lens or diffuser that emits light in a differed distribution pattern. The first and second illumination ranges $\Theta_1$, $\Theta_2$ may correspond to the particular functions each of the first and second light sources 18, 20 are employed to achieve. For example, the first light source 18 may be implemented to aid in recording facial recognition, and the second light source 20 may be implemented to aid in recording activity in the cabin 24 more generally, including monitoring passengers 25a, 25b.

Referring to FIG. 8, the second illumination range $\Theta_2$ may overlap the first illumination range $\Theta_1$. For example, the first and second light sources 18, 20 may have similar lens properties and orientations. In such cases, the controller 32 may alternatively activate the first and second light sources 18, 20 to toggle on and off sequentially in order to capture movement and/or direction of the eyes 26. In coordination with the illumination sequence, the imager 28 may capture a first image while the first light source 18 is energized and the second light source 20 is de-energized. A second image may be captured while the first light source 18 is de-energized and the second light source 20 is energized. The first and second images may then be compared to provide a focal direction of the eye 26. In this way, the eye glint and/or the pupil may be tracked for the occupant 25 if glasses cover the eye 26 of the occupant 25.

The system 10 may employ particular lighting techniques that allow the controller 32 to identify the eye glint in the event that the occupant 25 dons wearable glasses. When a lens, such as a focal lens provided with wearable glasses, is disposed between one or both light sources 18, 20 and the eyes 26, a light glare spot may form on the wearable glasses. The light glare spot may obstruct the imager 28 from capturing a view of the pupil. However, some light may pass through the lens and reflect off of the eyes 26 to form the eye glint. Due to the presence of the light glare spot and the eye glint simultaneously, detection of the pupil and/or determination of which reflection (e.g., either the light glare spot or the eye glint) is the eye glint may be challenging. By alternating pulses of light from the light sources 18, 20, light reflected off of lenses of wearable glasses may produce different light glare spot locations. A comparison of the light glare spot locations may allow detection of the pupil and/or identification of the pupil, thereby indicating the focal direction of the eye 26.

Referring to FIGS. 8 and 9, the first light source 18 may be configured to project a first ray of light 40 onto a target surface corresponding to the first eye 26a of the occupant 25. The first light source 18 may also be configured to project a second ray of light 41 onto a target surface corresponding to the second eye 26b of the occupant 25. The first ray of light 40 may have a first light path 42 including a first projection component and a first reflection component (e.g., legs). The second ray of light 41 may have a second light path 48 including a second projection component and a second reflection component (e.g., legs). The first ray of light 40 may project from the first light source 18 along the first projection component and reflect off of the driver's left eye 26a toward the imager 28 along the first reflection component, and the second ray of light 41 may project from the first light source 18 along the second projection component and reflect off of the driver's right eye 26b toward the imager 28 along the second reflection component.

As a result of the spacing between the first light source 18 and the imager 28, the first ray of light 40 may form a first angle of incidence 51 between the first projection component and the first reflection component. The second ray of light 41 may form a second angle of incidence $\delta_2$ between the second projection component and the second reflection component. The first and second projection/reflection components may be referred to herein as legs of each corresponding angle of incidence $\delta_1$, $\delta_2$. Each angle of incidence $\delta_1$, $\delta_2$ may be in the range of about 5° to 15°, and more particularly in the range of about 8° to 15° at a working distance of approximately 500 mm. The working distance may be in the range of about 300 mm to 700 mm. For example, an occupant 25 having a height of 1.9 meters may be reclined and/or situated at a distance (e.g., 650 mm) greater than a working distance (e.g., 400 mm) of an occupant 25 having a height of 1.5 meters. The second distance $D_2$ may be in the range of about 90 mm to 150 mm. The first distance $D_1$ and the second distance $D_2$ may be operable to define the angle of incidence in the range about 5° to 15°. It is generally contemplated that the first and second projection components may be within the first illumination range $\Theta_1$ and formed by the particular lens properties associated with the first light source 18.

As illustrated in FIG. 8, the second light source 20 may be configured to project a third ray of light 54 onto a target surface corresponding to the first eye 26a of the occupant 25. The second light source 20 may also be configured to project a fourth ray of light 56 onto a target surface corresponding to the second eye 26b of the occupant 25. The third ray of light 54 may have a third light path 58 including a third projection component and a third reflection component. The fourth ray of light 56 may have a fourth light path 64 including a fourth projection component and a fourth reflection component. The third ray of light 54 may project from the second light source 20 along the third projection component and reflect off of the driver's left eye 26a toward the imager 28 along the third reflection component. The fourth ray of light 56 may project from the second light source 20 along the fourth projection component and reflect off of the driver's right eye 26b toward the imager 28 along the fourth reflection component.

As previously discussed, the third light source 19 may be activated to provide additional light to the cabin 24 and allow for the first and/or second illuminations 22, 23 to dynamically adjust the illumination ranges $\Theta_1$, $\Theta_2$ based on the additional light. Additional auxiliary light sources 19 may be identified in the cabin 24 by processing an image of the cabin 24, and the controller 32 may operate the light sources 18, 20 to narrow the illumination ranges $\Theta_1$, $\Theta_2$ due to additional light projected from these auxiliary light sources 19. Stated differently, by providing auxiliary light sources 19 in the cabin 24, the first and second light sources 18, 20 may operate with narrower, more precise high-intensity ranges.

As a result of the spacing between the second light source 20 and the imager 28, the third ray of light 54 may form a third angle of incidence $\delta_3$ between the third projection component and the third reflection component. The fourth ray of light 56 may form a fourth angle of incidence $\delta_4$ between the fourth projection component and the fourth reflection component. The third and fourth projection/reflection components may be referred to herein as legs of each corresponding angle of incidence $\delta_3$, $\delta_4$. Each angle of incidence $\delta_3$, $\delta_4$ may be in the range of about 5° to 15°, and more particularly in the range of about 8° to 15° at a working distance of approximately 500 mm. In other words, the first distance $D_1$ and the second distance $D_2$ may be operable to define the angle of incidence $\delta_3$, $\delta_4$ in the range of about 5° to 15°. It is generally contemplated that the third and fourth projection components may be within the second illumination range $\Theta_2$ and formed by the particular lens properties associated with the second light source 20.

Referring to FIG. 9, the second light source 20 may have different lens properties and/or a different orientation than the first light source 18. In this way, the second illumination range $\Theta_2$ may encompass a broader area of the cabin 24 and/or a different area of the cabin 24 than the first light source 18 is configured to illuminate. For example, the second illumination range $\Theta_2$ may be configured to illuminate, at least, the front passenger compartment 24b and the rear passenger compartment 24c of the cabin 24. In this way, the second light source 20 may be operable to allow the imager 28 to capture image data related to passenger status, drowsiness of the occupants 25, etc., and the first light source 18 may be operable to allow the imager 28 to capture biometric data of the driver 25a. It is generally contemplated that, in addition or in an alternative, the second light source 20 may be configured to output light with a greater intensity than the first light source 18.

Because the first light source 18 and the second light source 20 may each be spaced from the imager 28, the imaging system 10 may be operable to distribute individual thermal energy loads within the housing 16. Further, independent control of each light source 18, 20 may allow the imaging system 10 to prioritize the operation of the first and second light sources 18, 20. For example, if the controller 32 detects an overheat condition of the housing 16, or any other component of the imaging system 10, the controller 32 may be operable to deactivate the second light source 20 and only operate the first light source 18, or vice versa. The controller 32 may be pre-programmed to determine the priority of the first and second light sources 18, 20 in various scenarios, or may be programmed to update a prioritization memory based on repeated use (e.g., iterative training). According to some aspects of the present disclosure, the controller 32 may be operable to receive thermal data corresponding to thermal energy of the mirror assembly 12 and control the first and second light sources 18, 20 based on the thermal data. For example, the controller 32 may be operable to deactivate the second light source 20 based on the thermal data of the mirror assembly 12.

In some examples, the first light source 18 and the second light source 20 may be in interchanged positions, with the first light source 18 disposed at the second side 21b of the mirror assembly 12 and the second light source 20 disposed at the first side 21a of the mirror assembly 12. Because the imager 28 may be centrally disposed on/in the mirror assembly 12, the arrangement of the first light source 18 and the second light source 20 may allow the mirror assembly 12 to operate in a left-hand drive position (as illustrated) or a right-hand drive position without disassembly of the imaging system 10. Accordingly, the first light source 18 may operate with a wavelength of approximately 940 nm, and the second light source 20 may operate in the range of about 810 nm to 880 nm.

According to one aspect of the present disclosure, the imaging system 10 may be configured to selectively operate between a left-hand drive mode and a right-hand drive mode. In other words, the imaging system 10 may be considered to be "universal" in operation. For example, the first light source 18 and the second light source 20 may share identical lens properties (e.g., having the same orientation, same light output energy, same pattern, etc.), with the first light source 18 disposed on the first side 21a of the mirror assembly 12 and the second light source 20 disposed on the second side 21b of the mirror assembly 12, opposite the first side 21a. In this way, a mirror assembly 12 manufactured according to this aspect may be incorporated into vehicles with left-hand driving positions and vehicles having right-hand driving positions without change in function.

By way of example, because the imager 28 may be configured to capture images of the cabin 24, including the steering wheel 17, the controller 32 may be configured to determine the position of the steering wheel 17 and determine the configuration of the vehicle (e.g., left-hand or right-hand drive) based on the position of the steering wheel 17. This example is not intended to be limiting, as the controller 32 may additionally or alternatively be configured to determine the configuration of the vehicle based on identification of occupants 25 in the cabin 24, or other vehicle features. Once the configuration of the vehicle is determined, control of the first and second light sources 18, 20 may be optimized. For example, the controller 32 may be configured to prioritize employment of the light source associated with driver 25a recognition over employment of the light source associated with the front or rear passenger compartment 24b, 24c of the cabin 24 in the event of the mirror assembly 12 meeting a thermal threshold. Continuing with this example, the controller 32 may be configured to de-activate either the first light source 18 or the second light source 20 depending on the configuration of the vehicle.

According to one aspect of the invention, an imaging system is provided including a mirror assembly having at least one imager in connection with the mirror assembly and configured to acquire an image of a biometric feature of a vehicle occupant within a field of view of the imager. A first light source is disposed within the mirror assembly and configured to project a ray of light onto a target surface corresponding to an eye of the vehicle occupant. The first light source is spaced from the target surface by a first distance. The first light source is spaced from the imager by a second distance, wherein the ray of light forms an angle of incidence having legs extending from the target surface to the first light source and to the imager, and wherein the first distance and the second distance define the angle of incidence in the range of 5° to 15°.

According to various aspects, the disclosure may implement one or more of the following features or configuration in various combinations:

the angle of incidence is at least 8°;
the field of view comprises a horizontal field component in the range of 120° to 160°;
the horizontal field component is in the range of 135° to 150°;
the field of view comprises a vertical field component configured to capture a lower body portion of the vehicle occupant;
a controller in communication with the first light source and the imager;

the controller operable to detect a mobile device proximate to the lower body portion of the vehicle occupant;
the controller is operable to communicate an instruction to control an indicator indicating a warning condition;
a second light source in connection with the mirror assembly;
the first light source is disposed on a first side portion of the mirror assembly, opposite a second side portion, and the second light source is disposed on the second side;
each of the first light source and the second light source is spaced from the imager by the second distance;
the first distance is an emission distance from the light source to the vehicle occupant and the second distance is a spacing distance from each of the first light source and the second light source to the imager;
a second light source spaced from the first light source and in connection with the mirror assembly, wherein the second light source is configured to project an illumination into a front non-operator passenger compartment;
a controller in communication with the first light source, the second light source, and the imager;
the controller operable to receive thermal data corresponding to thermal energy of the mirror assembly and control the second light source based on the thermal data;
the controller is operable to deactivate the second light source based on the thermal data of the mirror assembly;
the field of view includes a horizontal field component configured to capture a driver compartment and a front non-operator passenger compartment; and/or
the biometric feature comprises an iris of the vehicle occupant, and the controller is further configured to process a scanning operation authenticating an identity of the vehicle occupant based on a depiction of the iris in the image data.

According to another aspect, a method for monitoring a passenger compartment of a vehicle is provided. The method including illuminating a field of view of at least one imager, receiving first image data from the at least one imager demonstrating a lower body portion of a vehicle occupant within a field of view of the imager and receiving second image data from the at least one imager demonstrating at least one eye of the vehicle occupant. The method further includes detecting a presence of a mobile device proximate to the lower body portion based on the first image data. A gaze direction of the vehicle occupant is detected based on the second image data, and the method identifies a distraction condition of the vehicle occupant in response to the gaze direction and the presence of the mobile device.

According to various aspects, the disclosure may implement one or more of the following steps or features in various combinations:

the gaze direction identifies a focal direction of an eye of the vehicle occupant depicted in the second image data; and/or
determining, based on the presence of a mobile device proximate to the lower body portion and the focal direction of the eye, a distraction condition corresponding to the vehicle occupant viewing the mobile device.

According to yet another aspect of the invention, an imaging system is provided comprising a mirror assembly with at least one imager in connection with the mirror assembly and configured to acquire an image of a biometric feature of a plurality of vehicle occupants within a field of view of the imager. A first light source is disposed on a first side portion of the mirror assembly and configured to project a ray of light onto a target surface corresponding to an eye of an operator of the vehicle occupant. The first light source is spaced from the target surface by an emission distance from the light source to the operator. A second light source is disposed on a second side portion of the mirror assembly opposite the first side portion. The second light source is configured to project an illumination into a front non-operator passenger compartment. Each of the first light source and the second light source is spaced from the imager by a common spacing distance. The ray of light forms an angle of incidence having legs extending from the target surface to the first light source and to the imager, and wherein the focal distance and the spacing distance define the angle of incidence in the range of 5° to 15°.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An imaging system comprising:
   a mirror assembly;
   at least one imager in connection with the mirror assembly and configured to acquire an image of a biometric feature of a vehicle occupant within a field of view of the imager;
   a first light source disposed within the mirror assembly and configured to project a ray of light onto a target surface corresponding to an eye of the vehicle occupant, the first light source spaced from the target surface by a first distance; and
   wherein the first light source is spaced from the imager by a second distance, wherein the ray of light forms an angle of incidence having legs extending from the target surface to the first light source and to the imager, and wherein the first distance and the second distance define the angle of incidence in the range of 5° to 15°.

2. The imaging system of claim 1, wherein the angle of incidence is at least 8°.

3. The imaging system of claim 1, wherein the field of view comprises a horizontal field component in the range of 120° to 160°.

4. The imaging system of claim 3, wherein the horizontal field component is in the range of 135° to 150°.

5. The imaging system of claim 1, wherein the field of view comprises a vertical field component configured to capture a lower body portion of the vehicle occupant.

6. The imaging system of claim 5, further comprising:
   a controller in communication with the first light source and the imager, the controller operable to:
   detect a mobile device proximate to the lower body portion of the vehicle occupant.

7. The imaging system of claim 6, wherein the controller is operable to:
   communicate an instruction to control an indicator indicating a warning condition.

8. The imaging system of claim 1, further comprising:
   a second light source in connection with the mirror assembly.

9. The imaging system of claim 8, wherein the first light source is disposed on a first side portion of the mirror assembly, opposite a second side portion, and the second light source is disposed on the second side.

10. The imaging system of claim 9, wherein each of the first light source and the second light source is spaced from the imager by the second distance.

11. The imaging system of claim 8, wherein the first distance is an emission distance from the light source to the vehicle occupant and the second distance is a spacing distance from each of the first light source and the second light source to the imager.

12. The imaging system of claim 1, further comprising:
   a second light source spaced from the first light source and in connection with the mirror assembly, wherein the second light source is configured to project an illumination into a front non-operator passenger compartment.

13. The imaging system of claim 12, further comprising:
   a controller in communication with the first light source, the second light source, and the imager, the controller operable to:
   receive thermal data corresponding to thermal energy of the mirror assembly; and
   control the second light source based on the thermal data.

14. The imaging system of claim 13, wherein the controller is operable to deactivate the second light source based on the thermal data of the mirror assembly.

15. The imaging system of claim 1, wherein the field of view includes a horizontal field component configured to capture a driver compartment and a front non-operator passenger compartment.

16. The imaging system according to claim 1, wherein the biometric feature comprises an iris of the vehicle occupant, and the controller is further configured to process a scanning operation authenticating an identity of the vehicle occupant based on a depiction of the iris in the image data.

17. An imaging system comprising:
   a mirror assembly;
   at least one imager in connection with the mirror assembly and configured to acquire an image of a biometric feature of a plurality of vehicle occupants within a field of view of the imager;
   a first light source disposed on a first side portion of the mirror assembly and configured to project a ray of light onto a target surface corresponding to an eye of an operator of the vehicle occupant, the first light source spaced from the target surface by an emission distance from the light source to the operator;
   a second light source disposed on a second side portion of the mirror assembly opposite the first side portion, wherein the second light source is configured to project an illumination into a front non-operator passenger compartment, and wherein each of the first light source and the second light source is spaced from the imager by a common spacing distance; and wherein the ray of light forms an angle of incidence having legs extending from the target surface to the first light source and to the imager, and wherein the focal distance and the spacing distance define the angle of incidence in the range of 5° to 15°.

18. The imaging system of claim 1, wherein the ray of light projected onto the target surface comprises a first ray and a second ray, and the target surface comprises a plurality of targets comprising a first eye and a second eye.

19. The imaging system of claim 18, wherein the first ray forms a first angle of incidence with the first eye having legs extending from the first light source to the first eye and from the first eye to the imager, wherein the first angle of incidence is in the range of 5° to 15°.

20. The imaging system of claim 19, wherein the second ray forms a second angle of incidence with the second eye having legs extending from the first light source to the second eye and from the second eye to the imager, wherein the second angle of incidence is in the range of 5° to 15°.

* * * * *